J. A. MILLER.
HANDLE BAR MECHANISM FOR PLEASURE RAILWAYS.
APPLICATION FILED FEB. 15, 1912.

1,038,175.

Patented Sept. 10, 1912.

2 SHEETS—SHEET 1.

J. A. MILLER.
HANDLE BAR MECHANISM FOR PLEASURE RAILWAYS.
APPLICATION FILED FEB. 15, 1912.

1,038,175.

Patented Sept. 10, 1912.

2 SHEETS—SHEET 2.

Witnesses:
Charles J. Schmidt.
Nellie D. Dearborn.

Inventor:
John A. Miller,
By Offield, Towle, Graves & Offield
Att'ys.

UNITED STATES PATENT OFFICE.

JOHN A. MILLER, OF HOMEWOOD, ILLINOIS.

HANDLE-BAR MECHANISM FOR PLEASURE-RAILWAYS.

1,038,175.   Specification of Letters Patent.   Patented Sept. 10, 1912.

Application filed February 15, 1912. Serial No. 677,815.

*To all whom it may concern:*

Be it known that I, JOHN A. MILLER, residing at Homewood, in the county of Cook and State of Illinois, have invented certain new and useful Improvements in Handle-Bar Mechanism for Pleasure-Railways, of which the following is a specification.

My invention relates to handle bar mechanism for pleasure railways, and concerns particularly improved locking mechanism for the handle bar structures.

Among the important objects of the invention are to provide simplified lever mechanisms for engaging with the lower ends of intermediately pivoted handle bar structures and to provide such arrangement that the locking controlling mechanism is inaccessible to occupants of the car; to provide adjusting means for the locking mechanism whereby adjustment can be made for individually and independently locking each handle bar structure or for effecting simultaneous locking thereof as may be desired; and to provide such construction and arrangement that the handle bar structures will be simultaneously released.

Figure 1:
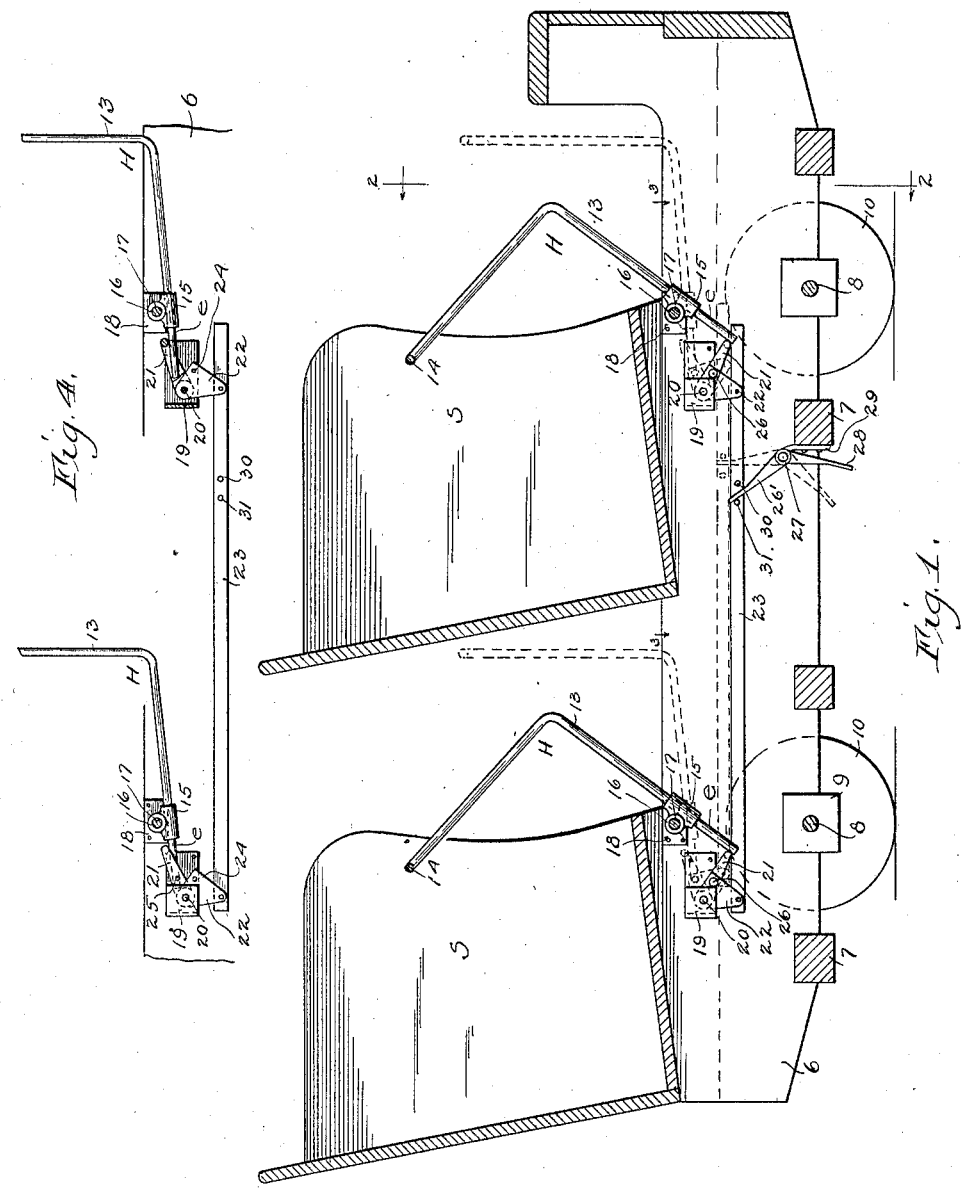
Figure 2:
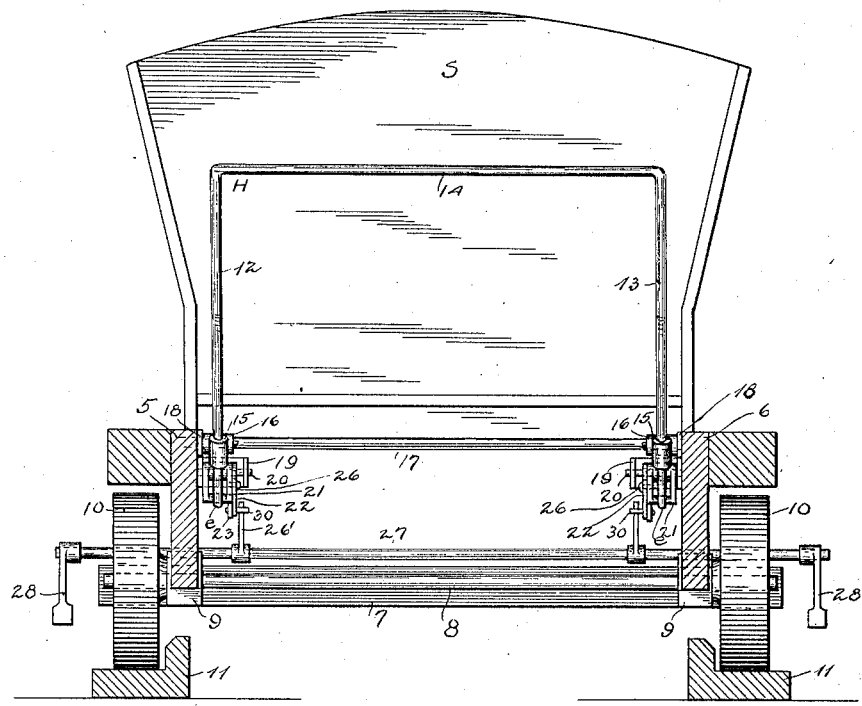
Figure 3:
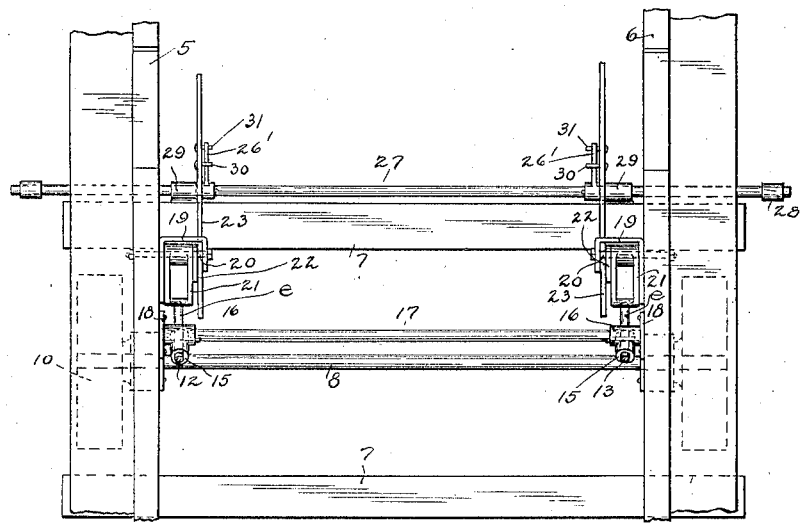

The accompanying drawings illustrate construction and arrangement for carrying out the various features of the invention, and in the drawings Figure 1 is a section of a car taken from a median longitudinal plane, Fig. 2 is a sectional view taken on line 2—2, Fig. 1, Fig. 3 is a plan view taken substantially from plane 3—3, Fig. 1, and Fig. 4 shows the position of the handle bar controlling mechanism under certain conditions.

The car body shown comprises side walls 5 and 6 connected together by cross beams 7, axles 8 being journaled in bearings 9 and carrying wheels 10 for supporting the car on track structures 11.

The car body may support any number of seats S of the usual construction and arrangement.

Each handle bar structure H comprises L-shaped end bars 12 and 13 connected together at their upper ends by a cross bar 14. The lower ends of the sides 12 and 13 of each handle bar structure pass through sleeves 15, each of which has a hub 16 running at right angles therewith and secured to a shaft 17 having bearing in blocks 18 secured to the inner sides of the opposite side walls 5 and 6. The hubs are rigidly secured to the shaft, and the handle bar structure ends may be adjusted in their sleeves 15 and are then rigidly secured therein by suitable means. Secured adjacent each bearing block 18 to the corresponding side wall of the car and underneath the corresponding seat is a U-shaped bearing bracket 19 journaling in its bend a shaft 20. A detent link 21 is pivoted at one end to the shaft 20 and coöperates at its other end with the adjacent end e of the handle bar structure which extends downwardly beyond the sleeve 15, the opposite links for each handle bar structure releasing the structure when in an upper position and having locking engagement therewith when in the lowermost position. Also pivoted to each shaft 20 and directly adjacent the inner side of the corresponding detent link is a plate 22, the plates at each side of the car pivoting at their lower ends to a connecting bar 23. As best illustrated in Fig. 4, each plate has a pin-hole 24 adapted to register with the pin-hole 25 in the side of the corresponding link, so that a pin 26 may be inserted through the registering holes to lock the plate to the link. When the pins are inserted, as shown in Figs. 1, 2 and 3, locking of all the handle bars will take place simultaneously when the last handle bar is moved to its closed position. When the pins are omitted, as illustrated in Fig. 4, each handle bar may be individually locked. In both cases, however, all the handle bar structures will be simultaneously released upon movement of the bars 23.

To automatically control the movement of the bars 23 to release the locking mechanisms means are provided to co-act with abutment rails on the track. This means comprises arms 26' extending upwardly from a shaft 27 and arms 28 extending downwardly from the shaft for engagement with abutment rails on the track. The shaft is journaled in bearing frames 29 secured to one of the cross beams 7 of the car body. Each of the arms 26 extends between front and rear pins 30 and 31 on the adjacent connecting bar 23 so that upon rotation of the shaft 27 the arms 26 will engage the front or rear pins to cause forward or rearward movement of the connecting bars.

Referring to Figs. 1, 2 and 3, the full lines show the handle bar structures in locked position, and the dotted lines show the handle bar structures in unlocked position.

Suppose that the car is traveling toward the right and suitable abutment rails are engaged by the levers 28, the arms 26' will be swung clockwise and the bars 23 carried upwardly and forwardly from the full line position to the dotted line position. This movement of the bars 23 will swing the plates 22 about the shafts 20, and the pins 26 being inserted, the links 21 will be swung upwardly and their front ends carried away from the lower ends $e$ of the handle bar structures, and the handle bar structures being overbalanced will fall to the open or dotted line position, the ends $e$ thereof then extending into the links 21, as indicated. After the levers 28 leave the abutment rails the handle bar structures will remain opened, due to their weight. Passengers may now enter the car, and after each seat is filled the handle structures are moved to the upper or closed position, but will not be locked until the last handle bar has been moved into its closed position, for the reason that each handle bar structure is so overbalanced that it can alone keep the links and the bars 23 in their upper positions. So soon, however, as the last handle bar structure is moved to closed position these engaging links will be released and the bars 23 can drop to allow the links of the other handle bar structures to move to their lowermost positions to carry their front ends against the ends $e$ of the handle bar structure. In their lowermost position the links rest on the tops of the bars 23 and against the ends $e$ and are at substantially right angles with the ends $e$, so that the handle bar structures will be securely locked against opening.

If it is desired to lock each handle bar structure individually the pins 26 are removed to disconnect the plates 22 from the links, this arrangement being shown in Fig. 4. When each handle bar structure is raised its links are free to follow into detent engagement with the ends $e$, this being clearly apparent from the arrangement shown in Fig. 4. Release of the handle bar structures will, however, be simultaneous when the levers 28 coöperate with the abutment rails to effect raising of the connecting bars 23. Upon such movement of the connecting bars the various links will be sufficiently raised to form obtuse angles with the respective ends $e$ of the handle bar structures so as to break the detent engagement, and the handle bar structures then fall of their own weight and carry the links to their upper positions, as indicated in dotted lines, Fig. 1. Thus with the pins 26 omitted each handle bar structure may be individually and independently locked but will be released simultaneously, and when the pins are inserted locking will be simultaneous and effected when the last handle bar structure is moved to locking position, and unlocking will be simultaneously accomplished. Also when the pins are inserted the links will be moved positively to their upper position, whereas when the pins are removed the links are carried only part way upwardly by the connecting bars and the released handle bar structures carry them the remaining distance to their upper positions.

Although a connecting bar and associated link mechanisms are shown as provided at each side of the car, this is not essential, for one outfit would be sufficient, as the handle bar structure supporting hubs 16 could be rigidly keyed to the supporting shafts 17, and both ends of each handle bar structure would therefore be rigidly locked in position upon engagement of the detent link with one of the ends. The locking mechanism is disposed underneath the seats, so as to be inaccessible to passengers, and the handle bar structures cannot therefore be mischievously released during running of the car. No additional locking means for locking the links in locking position is therefore necessary. The construction is therefore extremely simple, yet most efficient and reliable, and safety is assured.

I do not, of course, desire to be limited to the precise construction and arrangement which I have shown and described, as changes and modifications are possible which would still come within the scope of the invention, and I claim the following:

1. In a pleasure vehicle, the combination with the vehicle body and a seat thereon, of a handle bar structure pivoted at an intermediate point to said body and adapted to swing to one position to allow entrance of passengers to the seat and to another position to lock the passengers in the seat, and a detent for engaging the lower end of said handle bar structure to lock said structure in its latter position.

2. In a pleasure railway car, the combination with the car body and a seat thereon, of a handle bar structure pivoted at an intermediate point to the car body, a detent arm pivoted to the car body and held in raised position by the handle bar structure when in its open position and adapted when said handle bar structure is moved into locking position to fall by gravity into detent engagement with the lower end of said handle bar structure, and means controlled from the exterior of the car for raising said detent lever to release the handle bar structure and to allow said structure to move to its open position.

3. In a pleasure railway car, the combination with the car body and a seat thereon, of a handle bar structure pivoted at its sides to the car body and extending a distance below its pivot points and adapted to swing into an open position and into a closed position with reference to the seat, a detent arm pivoted to the car body adjacent the lower end of the handle bar structure, said handle bar structure being overbalanced to normally rest in open position and to hold the detent arm in its upward position, said arm being free to fall by gravity when the handle bar structure is moved to its locking position, and an abutment for stopping the arm, said arm when thus stopped being in detent engagement with the lower end of the handle bar structure to lock such structure in its closed position.

4. In a pleasure railway car, the combination with the car body and a seat thereon, of a handle bar structure pivoted at its sides to the car body and extending a distance below its pivot points and adapted to swing into an open position and into a closed position with reference to the seat, a detent arm pivoted to the car body adjacent the lower end of the handle bar structure, said handle bar structure being overbalanced to normally rest in open position and to hold the detent arm in its upward position, said arm being free to fall by gravity when the handle bar structure is moved to its locking position, an abutment for stopping the arm, said arm when thus stopped being in detent engagement with the lower end of the handle bar structure to lock such structure in its closed position, and means controllable from the exterior of the car for raising said abutment to break the detent engagement between said arm and handle bar structure and to allow said structure to fall to its open position.

5. In a pleasure railway car, the combination with the car body and a plurality of seats thereon, of a handle bar structure for each seat pivoted at an intermediate point to the car body and overbalanced to tend to fall to an open position, a detent link associated with each handle bar structure and pivoted to the car body adjacent the lower end of such structure, said detent links being normally held out of detent engagement by the handle bar structures and adapted to fall when said handle bar structures are raised to locking position to then move into detent engagement with the lower ends of said handle bar structures to lock said structures in closed position, and means controllable from the exterior of the car for simultaneously moving the links out of detent engagement with said handle bar structures to allow said structures and links to return to their normal positions.

6. In a pleasure railway car, the combination with the car body and a plurality of seats thereon, of a handle bar structure for each seat pivoted at an intermediate point to the car body and overbalanced to tend to fall to open position, a detent link for each handle bar structure pivoted at one end to the car body and having its other end in engagement with the lower end of the handle bar structure, said links being normally held out of detent engagement by the handle bar structures when in their open positions and adapted to fall by gravity into a position at substantially right angles with the lower ends of the handle bar structures whereby said structures are locked in closed position, a common abutment member for receiving said links when in their detaining position, and means controllable from the exterior of the car for simultaneously moving said links to release the handle bar structures.

7. In a pleasure railway car, the combination with the car body and a plurality of seats thereon, of a handle bar structure for each seat pivoted at an intermediate point to the car body and overbalanced to tend to fall to open position, a detent link for each handle bar structure pivoted at one end to the car body and having its other end in engagement with the lower end of the handle bar structure, said links being normally held out of detent engagement by the handle bar structures when in their open positions and adapted to fall by gravity into a position at substantially right angles with the lower ends of the handle bar structures whereby said structures are locked in closed position, a common abutment member for receiving said links when in their detaining position, and a common abutment member for receiving said links when they reach their detaining positions, and means controllable from the exterior of the car for moving said member to raise said links to allow the handle bar structures to fall to their open positions.

8. In a pleasure railway car, the combination with the car body and a plurality of seats thereon, of a handle bar structure for each seat pivoted to the car body and extending a distance below its pivot line and overbalanced to tend to fall to a normal open position, a detent link pivoted at one end to the car body and having its other end in engagement with the lower end of the corresponding handle bar structure, a connecting bar connecting said links, said links and connecting bar being normally held in raised position by the handle bar structures when in open position, movement of said handle bar structures to closed position allowing said links and connecting bar to fall by gravity until the links are at substantially right angles with the handle bar structures to lock said structures in closed position, and means controllable from the exterior of the car for shifting said connecting bar to cause raising of the links to release the handle bar structures.

9. In a pleasure railway car, the combination with the car body and a plurality of seats thereon, of a handle bar structure for each seat pivoted to the car body, a detent link pivoted to the car body adjacent each handle bar structure and adapted when in raised position to allow the handle bar structure to move to open position and when in a lower position to lock the handle bar structure in closed position, and a connecting rod for said links for simultaneously controlling the operation thereof.

10. In a pleasure railway car, the combination with the car body and a plurality of seats thereon, of a handle bar structure for each seat pivoted at an intermediate point to the car body and overbalanced to tend to fall to an open position, a link for each handle bar structure pivoted at one end to the car body and having its other end resting against the lower end of the handle bar structure to follow the movements of said structure, said links being normally held in upper position by the handle bar structures when open and being caused by gravity to fall into a position at substantially right angles with the lower ends of the handle bar structures when the handle bar structures are moved to closed position whereby said handle bar structures are then locked in closed position, a connecting rod having detachable connection with each link, and means for controlling said connecting rod, said connecting rod when attached to the links being adapted when actuated to positively raise the links to their uppermost positions to release the handle bar structures, and said links when detached from the connecting rod being raised only sufficiently by the actuating connecting rod to be at obtuse angles with the handle bar structures whereby after such preliminary adjustment by the connecting rod the links will be carried to uppermost position by the released handle bar structures when such structures fall to their open position.

11. In a pleasure railway car, the combination with the car body and seats thereon, of a handle bar structure for each seat pivoted along an intermediate line to said car body, a detent link for each handle bar structure pivoted at one end to the car body and having its other end resting against the lower end of the handle bar structure to follow the movements thereof, a plate pivoted adjacent each link and having detachable connection therewith, a connecting rod for said plates, and means controllable from the exterior of the car for controlling said connecting rod.

In witness whereof, I hereunto subscribe my name this 13th day of February, A. D., 1912.

JOHN A. MILLER.

Witnesses:
NELLIE B. DEARBORN,
JOYCE M. LUTZ.

---

Copies of this patent may be obtained for five cents each, by addressing the "Commissioner of Patents, Washington, D. C."